(12) United States Patent
Snell

(10) Patent No.: US 11,480,215 B2
(45) Date of Patent: Oct. 25, 2022

(54) SELF-CENTERING AUXILIARY BEARINGS IN A MAGNETIC BEARING CARTRIDGE

(71) Applicant: Johnson Controls Technology Company, Auburn Hills, MI (US)

(72) Inventor: Paul W. Snell, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 292 days.

(21) Appl. No.: 16/612,584

(22) PCT Filed: Jul. 10, 2018

(86) PCT No.: PCT/US2018/041478
§ 371 (c)(1),
(2) Date: Nov. 11, 2019

(87) PCT Pub. No.: WO2019/014244
PCT Pub. Date: Jan. 17, 2019

(65) Prior Publication Data
US 2020/0208678 A1 Jul. 2, 2020

Related U.S. Application Data

(60) Provisional application No. 62/531,639, filed on Jul. 12, 2017.

(51) Int. Cl.
*F16C 32/04* (2006.01)
*F16C 33/58* (2006.01)
(Continued)

(52) U.S. Cl.
CPC ........ *F16C 32/0442* (2013.01); *F16C 32/047* (2013.01); *F16C 32/0476* (2013.01);
(Continued)

(58) Field of Classification Search
CPC ............... F16C 32/0442; F16C 32/047; F16C 32/0476; F16C 33/586; F16C 33/60; F16C 35/042; F16C 2362/52; F16C 2226/12
(Continued)

(56) References Cited

U.S. PATENT DOCUMENTS 4,362,342 A 12/1982 Bushor et al.
4,887,916 A 12/1989 Adam et al.
(Continued)

FOREIGN PATENT DOCUMENTS

CN 1217437 A 5/1999
CN 101140013 A 3/2008
(Continued)

OTHER PUBLICATIONS

Chinese Office Action for CN Application No. 201880042273.9 dated Dec. 22, 2021, 4 pgs.
(Continued)

Primary Examiner — Ahmed Elnakib
(74) Attorney, Agent, or Firm — Fletcher Yoder, P.C.

(57) ABSTRACT

A self-centering bearing assembly is provided. The bearing assembly includes a magnetic bearing device configured to support a rotating shaft and a magnetic bearing support housing. The magnetic bearing housing has a disc-like shape and multiple tabs extending from an outer diameter portion in an axial direction. The bearing assembly further includes an auxiliary bearing device configured to support the rotating shaft during an auxiliary bearing condition, and an auxiliary bearing support housing. The auxiliary bearing support housing has a disc-like shape with a first diameter portion and a second diameter portion. The first diameter portion has a larger diameter than the second diameter portion. The tabs are configured to couple to the second diameter portion such that the auxiliary bearing support
(Continued)

housing is concentric to the magnetic bearing support housing.

20 Claims, 8 Drawing Sheets

(51) Int. Cl.
  *F16C 33/60* (2006.01)
  *F16C 35/04* (2006.01)
(52) U.S. Cl.
  CPC ............ *F16C 33/586* (2013.01); *F16C 33/60* (2013.01); *F16C 35/042* (2013.01); *F16C 2362/52* (2013.01)
(58) Field of Classification Search
  USPC ........................................................ 310/90.5
  See application file for complete search history.

(56) References Cited

U.S. PATENT DOCUMENTS

| | | | |
|---|---|---|---|
| 5,455,471 A | 10/1995 | Dowell | |
| 5,714,818 A * | 2/1998 | Eakman | F16C 39/02 310/90.5 |
| 5,749,700 A * | 5/1998 | Henry | F16C 32/0476 310/90.5 |
| 6,710,485 B2 | 3/2004 | Steuer et al. | |
| 8,348,515 B2 | 1/2013 | Fugel et al. | |
| 9,024,494 B2 | 5/2015 | Hawkins et al. | |
| 2004/0023750 A1 | 2/2004 | Schulz et al. | |
| 2008/0185928 A1* | 8/2008 | Buhler | F16C 32/0459 310/90.5 |
| 2011/0285233 A1 | 11/2011 | Singhal et al. | |
| 2012/0213629 A1 | 8/2012 | Rouesne | |
| 2013/0280063 A1* | 10/2013 | Ganiger | F01D 25/164 415/229 |
| 2014/0072253 A1 | 3/2014 | Ruhl et al. | |
| 2015/0028706 A1 | 1/2015 | Anders et al. | |
| 2016/0298680 A1 | 10/2016 | Huang et al. | |
| 2017/0146271 A1 | 5/2017 | Hasegawa et al. | |
| 2021/0332854 A1* | 10/2021 | Snell | F16C 37/00 |

FOREIGN PATENT DOCUMENTS

| | | |
|---|---|---|
| CN | 101344036 A | 1/2009 |
| CN | 102472685 A | 5/2012 |
| CN | 104011335 A | 8/2014 |
| CN | 104271892 A | 1/2015 |
| CN | 104508957 A | 4/2015 |
| CN | 104863869 A | 8/2015 |
| CN | 105452672 A | 3/2016 |
| CN | 106936237 A | 7/2017 |
| EP | 2 829 756 | 6/2016 |
| JP | H10037959 A | 2/1998 |
| JP | H11234960 A | 8/1999 |
| JP | 2007162493 A | 6/2007 |
| TW | 373054 | 11/1999 |
| TW | 505756 | 10/2002 |

OTHER PUBLICATIONS

Chinese Office Action for CN Application No. 201880042273.9 dated Sep. 2, 2020, 9 pgs.
International Search Report and Written Opinion on International Patent Application No. PCT/US2018/041478 dated Oct. 1, 2018. 13 pages.
Taiwanese Office Action for Taiwan Application No. TW 107123916 dated Mar. 5, 2019, 7 pages.
Japanese Office Action for JP Application No. 2019-568222, dated Jul. 26, 2022, 3 pages.

* cited by examiner (SECTION A-A)

SELF-CENTERING AUXILIARY BEARINGS IN A MAGNETIC BEARING CARTRIDGE

CROSS-REFERENCE TO RELATED PATENT APPLICATIONS

This application is a U.S. National Stage Application of PCT/US2018/041478, filed Jul. 10, 2018, which claims the benefit of U.S. Provisional Application 62/531,639, filed Jul. 12, 2017, both of which are incorporated herein by reference in their entirety.

BACKGROUND

The present invention relates generally to a self-centering bearing assembly that can be used to support a rotating shaft, for example, a motor shaft of a high speed induction motor that the drives the centrifugal compressor of a chiller assembly. Use of magnetic bearings in a high speed induction motor minimizes friction in order to improve motor performance and prevent excessive wear. An auxiliary backup bearing can be concentrically mounted with each magnetic bearing in order to support the rotating shaft when the motor is stationary, or when an overload condition or system fault occurs. Locating an auxiliary bearing device relative to a magnetic bearing can include the use of individual shim parts and/or manual adjustment, which may be a difficult and time-consuming process.

SUMMARY

One implementation of the present disclosure is a self-centering bearing assembly. The bearing assembly includes a magnetic bearing device configured to support a rotating shaft and a magnetic bearing support housing. The magnetic bearing housing has a disc-like shape and multiple tabs extending from an outer diameter portion in an axial direction. The bearing assembly further includes an auxiliary bearing device configured to support the rotating shaft during an auxiliary bearing condition, and an auxiliary bearing support housing. The auxiliary bearing support housing has a disc-like shape with a first diameter portion and a second diameter portion. The first diameter portion has a larger diameter than the second diameter portion. The tabs are configured to couple to the second diameter portion such that the auxiliary bearing support housing is concentric to the magnetic bearing support housing.

In some embodiments, the tabs are coupled to the second diameter portion using an interference fit. In some embodiments, the auxiliary bearing device is a ball bearing including an inner ring, an outer ring, and multiple balls situated between the inner ring and the outer ring. In some embodiments, the tabs include at least three tabs. In some embodiments, the tabs are spaced about the outer diameter portion at regular intervals.

In some embodiments, the bearing assembly further includes an axial shim disposed between the magnetic bearing support housing and the auxiliary bearing support housing to maintain a required spacing between the magnetic bearing support housing and the auxiliary bearing support housing.

In some embodiments, the auxiliary bearing condition includes at least one of one of a deactivation of the magnetic bearing device, an overload of the magnetic bearing device, and a failure of a magnetic bearing device component.

Another implementation of the present disclosure is a vapor compression system. The vapor compression system includes a centrifugal compressor directly driven by a sealed induction motor, a condenser, an expansion device, and an evaporator connected in a closed refrigerant loop. The sealed induction motor includes a stator, a rotor, and a shaft with a first end and a second end. The sealed induction motor further includes a first radial magnetic bearing assembly located proximate the first end of the shaft and a second radial magnetic bearing assembly located proximate the second end of the shaft. The first and second radial magnetic bearing assemblies are configured to support the shaft in a radial direction. The sealed induction motor further includes a thrust magnetic bearing assembly configured to support the shaft in an axial direction. Each of the first radial magnetic bearing assembly, the second radial magnetic bearing assembly and the thrust magnetic bearing assembly includes a magnetic bearing device supported in a magnetic bearing housing and an auxiliary bearing device supported in an auxiliary bearing housing. The auxiliary bearing housing is coupled to the magnetic bearing housing using tabs extending from the magnetic bearing housing such that the auxiliary bearing housing is concentric to the magnetic bearing housing.

In some embodiments, the tabs are coupled to the auxiliary bearing housing using an interference fit. In some embodiments, the auxiliary bearing device is a ball bearing including an inner ring, an outer ring, and multiple balls situated between the inner ring and the outer ring. In some embodiments, the tabs include at least three tabs.

In some embodiments, the vapor compression system further includes an axial shim disposed between the magnetic bearing housing and the auxiliary bearing housing to maintain a required spacing between the magnetic bearing housing and the auxiliary bearing housing.

In some embodiments, each of the magnetic bearing housing and the auxiliary bearing housing has a disc-like shape.

Yet another implementation of the present disclosure is a self-centering bearing assembly. The bearing assembly includes a first bearing support housing coupled to a first bearing device configured to support a rotating shaft. The first bearing support housing has a disc-like shape and multiple tabs extending from an outer diameter portion in an axial direction. The bearing assembly further includes a second bearing support housing coupled to a second bearing device configured to support the rotating shaft. The second bearing support housing has a disc-like shape with a first diameter portion and a second diameter portion, the first diameter portion having a larger diameter than the second diameter portion. The tabs are configured to couple to the second diameter portion such that the second bearing support housing is concentric to the first bearing support housing.

In some embodiments, the first bearing device is a magnetic bearing device and the second bearing device is an auxiliary bearing device. In other embodiments, the first bearing device is an auxiliary bearing device and the second bearing device is a magnetic bearing device.

In some embodiments, the tabs are coupled to the second diameter portion using an interference fit. In some embodiments, the tabs include at least three tabs. In some embodiments, the tabs are spaced about the outer diameter portion at regular intervals.

In some embodiments, the second bearing device is a ball bearing including an inner ring, an outer ring, and multiple balls situated between the inner ring and the outer ring.

DETAILED DESCRIPTION

Figure 1:
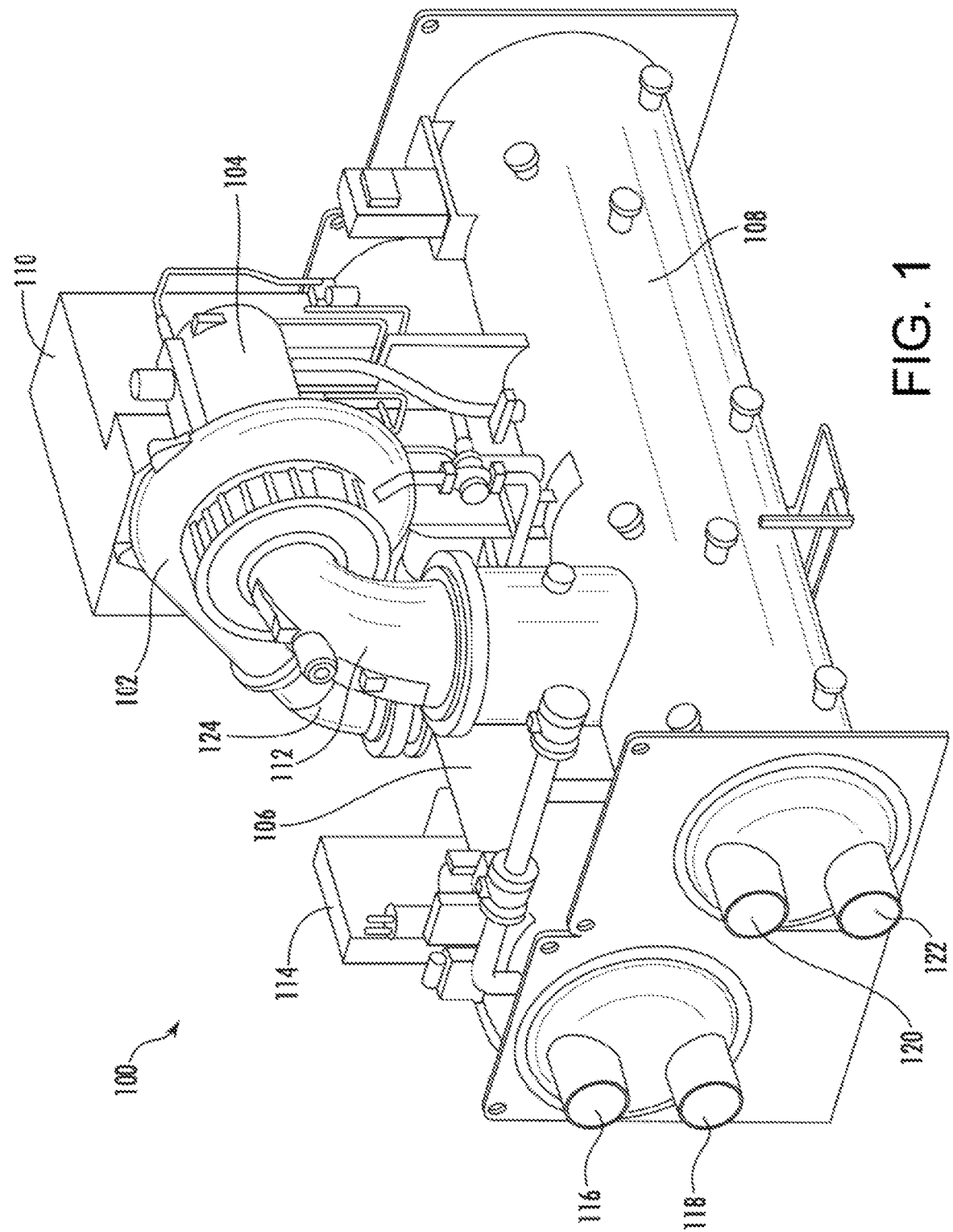
FIG. 1 is a perspective view drawing of a chiller assembly, according to some embodiments.
Figure 2:
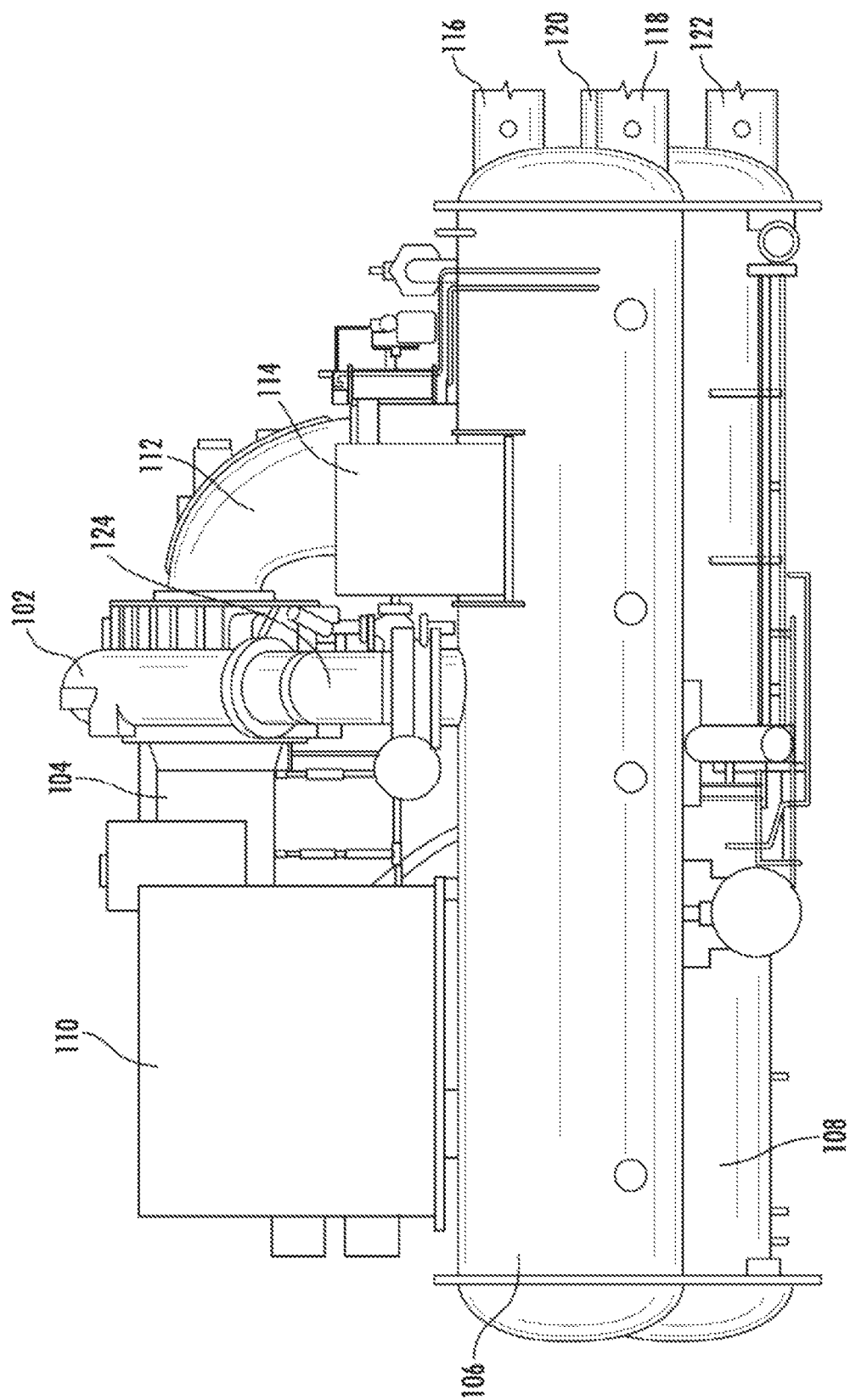
FIG. 2 is a front elevation view drawing of the chiller assembly of FIG. 1, according to some embodiments.

Referring generally to the FIGURES, a self-centering bearing assembly that can be utilized to support the motor shaft of a centrifugal compressor in a chiller assembly is shown. Referring to FIGS. 1-2, an example implementation of a chiller assembly 100 is depicted. Chiller assembly 100 is shown to include a compressor 102 driven by a motor 104, a condenser 106, and an evaporator 108. A refrigerant is circulated through chiller assembly 100 in a vapor compression cycle. Chiller assembly 100 can also include a control panel 114 to control operation of the vapor compression cycle within chiller assembly 100.

Motor 104 can be powered by a variable speed drive (VSD) 110. VSD 110 receives alternating current (AC) power having a particular fixed line voltage and fixed line frequency from an AC power source (not shown) and provides power having a variable voltage and frequency to motor 104. Motor 104 can be any type of electric motor than can be powered by a VSD 110. For example, motor 104 can be a high speed induction motor. Compressor 102 is driven by motor 104 to compress a refrigerant vapor received from evaporator 108 through suction line 112 and to deliver refrigerant vapor to condenser 106 through a discharge line 124. Compressor 102 can be a centrifugal compressor, a screw compressor, a scroll compressor, or any other type of suitable compressor. In the example described in FIG. 2, compressor 102 is a centrifugal compressor.

Evaporator 108 includes an internal tube bundle (not shown), a supply line 120 and a return line 122 for supplying and removing a process fluid to the internal tube bundle. The supply line 120 and the return line 122 can be in fluid communication with a component within a HVAC system (e.g., an air handler) via conduits that that circulate the process fluid. The process fluid is a chilled liquid for cooling a building and can be, but is not limited to, water, ethylene glycol, calcium chloride brine, sodium chloride brine, or any other suitable liquid. Evaporator 108 is configured to lower the temperature of the process fluid as the process fluid passes through the tube bundle of evaporator 108 and exchanges heat with the refrigerant. Refrigerant vapor is formed in evaporator 108 by the refrigerant liquid delivered to the evaporator 108 exchanging heat with the process fluid and undergoing a phase change to refrigerant vapor.

Refrigerant vapor delivered from evaporator 108 by compressor 102 to condenser 106 transfers heat to a fluid. Refrigerant vapor condenses to refrigerant liquid in condenser 106 as a result of heat transfer with the fluid. The refrigerant liquid from condenser 106 flows through an expansion device and is returned to evaporator 108 to complete the refrigerant cycle of the chiller assembly 100. Condenser 106 includes a supply line 116 and a return line 118 for circulating fluid between the condenser 106 and an external component of the HVAC system (e.g., a cooling tower). Fluid supplied to the condenser 106 via return line 118 exchanges heat with the refrigerant in the condenser 106 and is removed from the condenser 106 via supply line 116 to complete the cycle. The fluid circulating through the condenser 106 can be water or any other suitable liquid.

Figure 3:
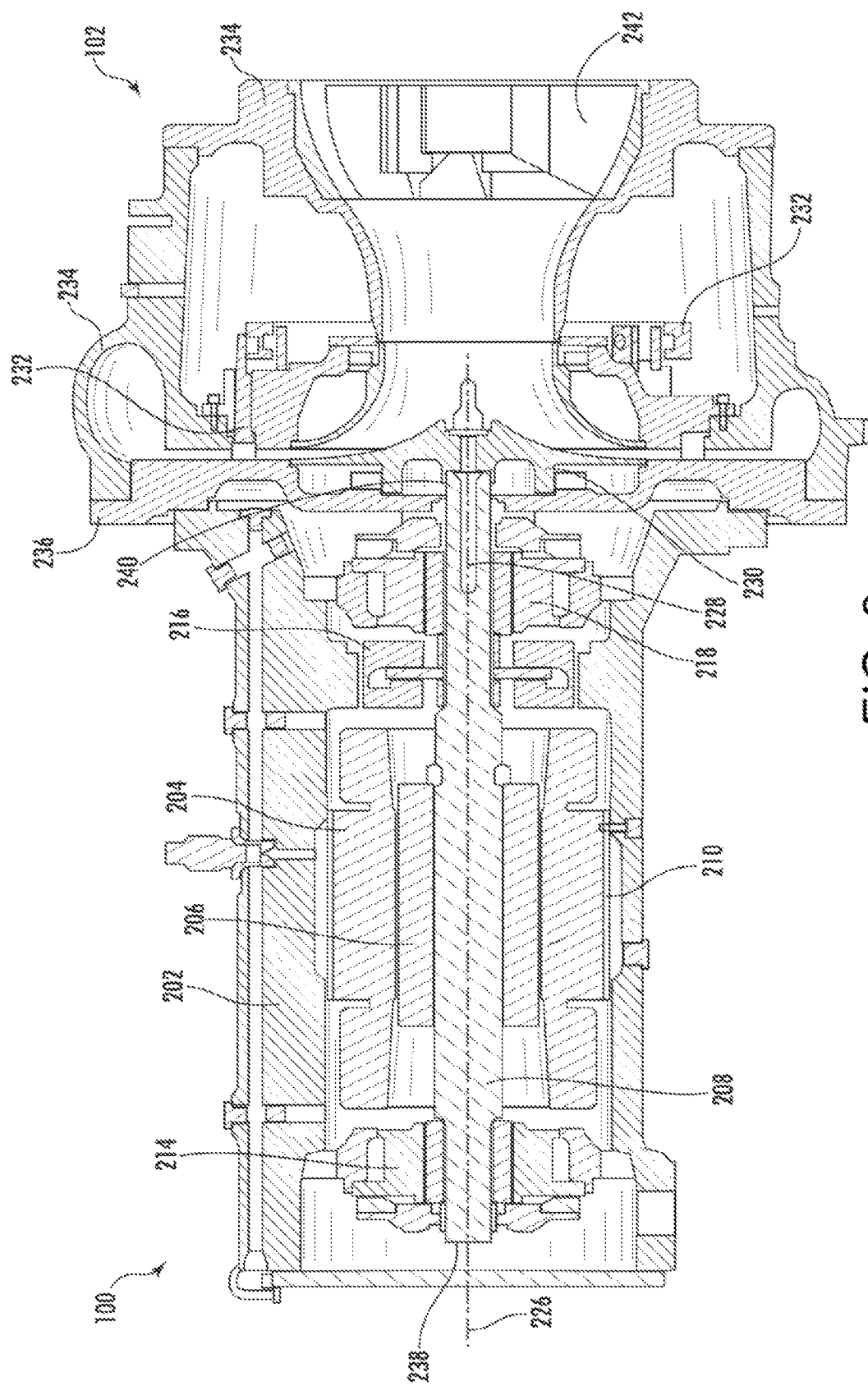
FIG. 3 is a sectional view drawing of the motor and centrifugal compressor of the chiller assembly of FIG. 1, according to some embodiments.

Referring now to FIG. 3, a sectional view of a high speed induction motor utilized to drive a centrifugal compressor is shown. In some embodiments, the high speed induction motor is substantially similar to motor 104, and the centrifugal compressor is substantially similar to compressor 102, both described above with reference to FIG. 1. Motor 104 is shown to include among other components, an enclosure or housing 202, a stator 204, and a rotor 206. The stator 204 is the stationary part of the motor's electromagnetic circuit that imparts radial and axial magnetic forces on the rotor 206. In a properly aligned system, the sum of these forces is zero, or nearly zero. In some embodiments, the stator 204 is partially encapsulated by a motor jacket 210, and both the stator 204 and the motor jacket 210 may have a substantially cylindrical shape. The motor jacket 210 may be constructed from aluminum and may be configured to optimize heat transfer from the stator 204 to prevent overheating of the motor 104.

The rotor 206 is the rotating part of the motor's electromagnetic circuit. In various embodiments, the rotor 206 may be a squirrel-cage rotor, a wound rotor, a salient-pole rotor, or a cylindrical rotor. The rotor 206 is coupled to a shaft 208. The shaft 208 is shown to include a first end 238 and a second end 240. The rotor 206 and the shaft 208 collectively rotate about a central axis 226 in order to transmit torque and rotation to other components and/or assemblies coupled to the motor 104.

As shown in FIG. 3, the second end 240 of the shaft 208 is coupled to an impeller 230 of the centrifugal compressor 102 using a direct drive connection 228. In some embodiments, the direct drive connection 228 may include a mechanical fastener (e.g., a bolt, a pin) used to couple the shaft 208 to the impeller 230. Directly-driven systems provide advantages over gear-driven systems because they decrease friction losses and require fewer, simpler components. In addition to the impeller 230, the centrifugal compressor 102 can include, among other components, an inlet 242, a diffuser assembly comprised of a variable geometry diffuser (VGD) 232 and a diffuser plate 236, and a collector or scroll assembly 234. The inlet 242 can include a pipe that draws fluid (e.g., the LP refrigerant) to the impeller 230, which is a rotating set of vanes that gradually impart kinetic energy to the vapor. Downstream of the impeller 230 is the diffuser gap formed by the VGD 232 and the diffuser plate 236. The kinetic energy of the vapor is converted into pressure energy as it flows and expands through the diffuser gap and before it exits the centrifugal compressor via the collector or scroll assembly 234.

The motor 104 is further shown to include magnetic bearing assemblies 214, 216 and 218 that support the rotor 206 and shaft 208 and permit rotation of the rotor 206 and shaft 208 relative to the stator 204. Magnetic bearing assemblies support a load using magnetic levitation, and thus permit relative motion with very low friction and little or no mechanical wear. In some embodiments, magnetic bearing assemblies 214, 216, and 218 are active magnetic bearing (AMB) assemblies. AMB assemblies utilize electromagnetic actuators with continuously adjusted current values to keep the rotor 206 and shaft 208 in a desired position and achieve stable levitation.

The magnetic bearing assemblies 214 and 218 may be radial bearing assemblies configured to control the position of the shaft 208 in a radial direction (i.e., perpendicular to central axis 226), while magnetic bearing assembly 216 may be a thrust bearing assembly configured to control the position of the shaft 208 in an axial direction (i.e., parallel to central axis 226). In some embodiments, radial magnetic bearing assembly 214 may be located proximate the first end 238 of the shaft 208, while radial magnetic bearing assembly 218 may be located proximate the second end 240 of the shaft 208. Thrust magnetic bearing assembly 216 may be located between radial bearing assemblies 214 and 218, and near the second end 240 of the shaft 208 and the impeller 230. By locating the thrust magnetic bearing assembly 216 near the impeller 230, when heat caused by the operation of the motor 104 causes the shaft 208 to expand, the proximity of the thrust magnetic bearing assembly 216 permits precise alignment of the impeller 230 within the compressor diffuser to achieve an optimized aerodynamic performance.

Figure 4:
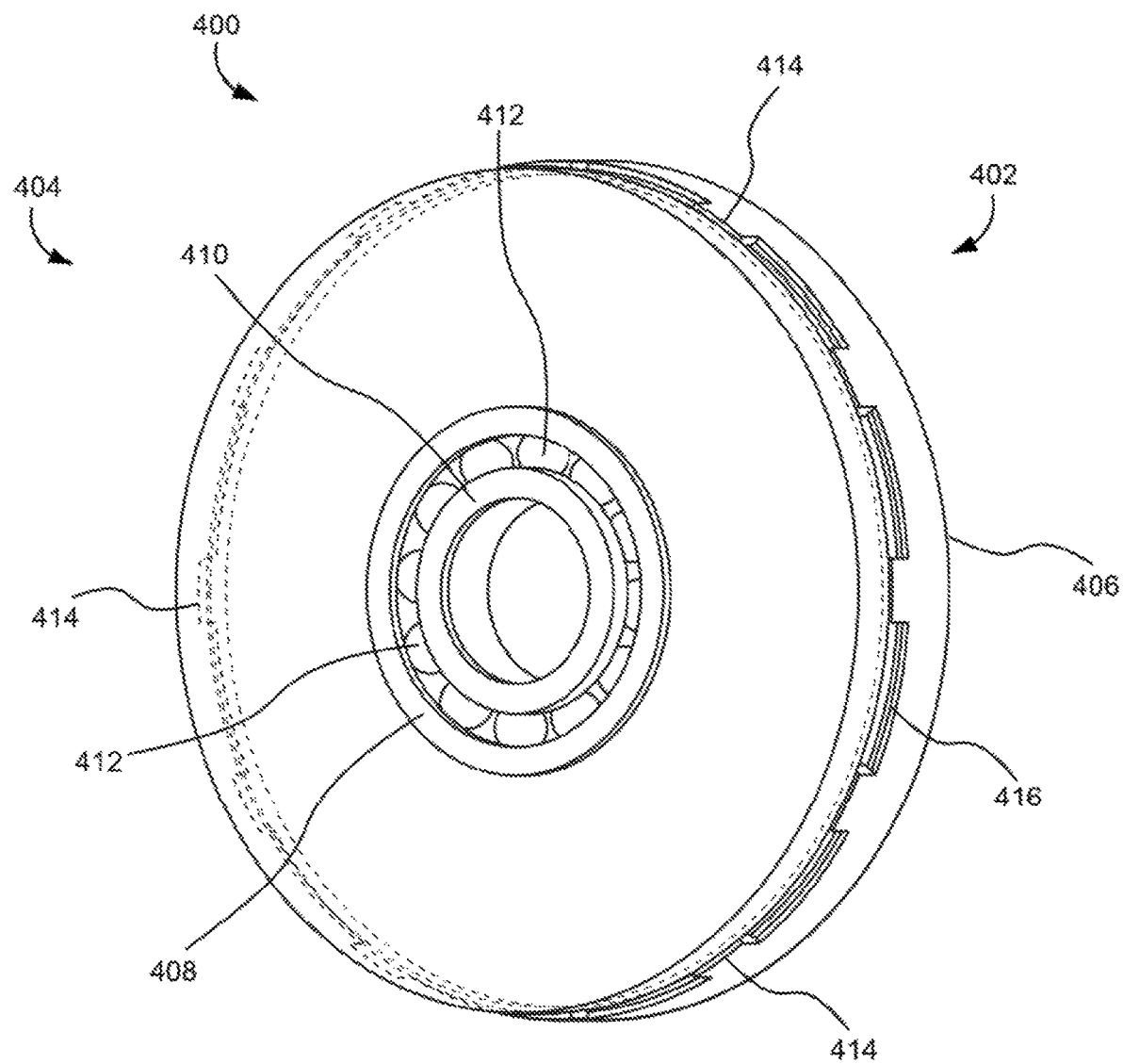
FIG. 4 is an isometric view drawing of a self-centering bearing assembly, according to some embodiments.
Figure 5:
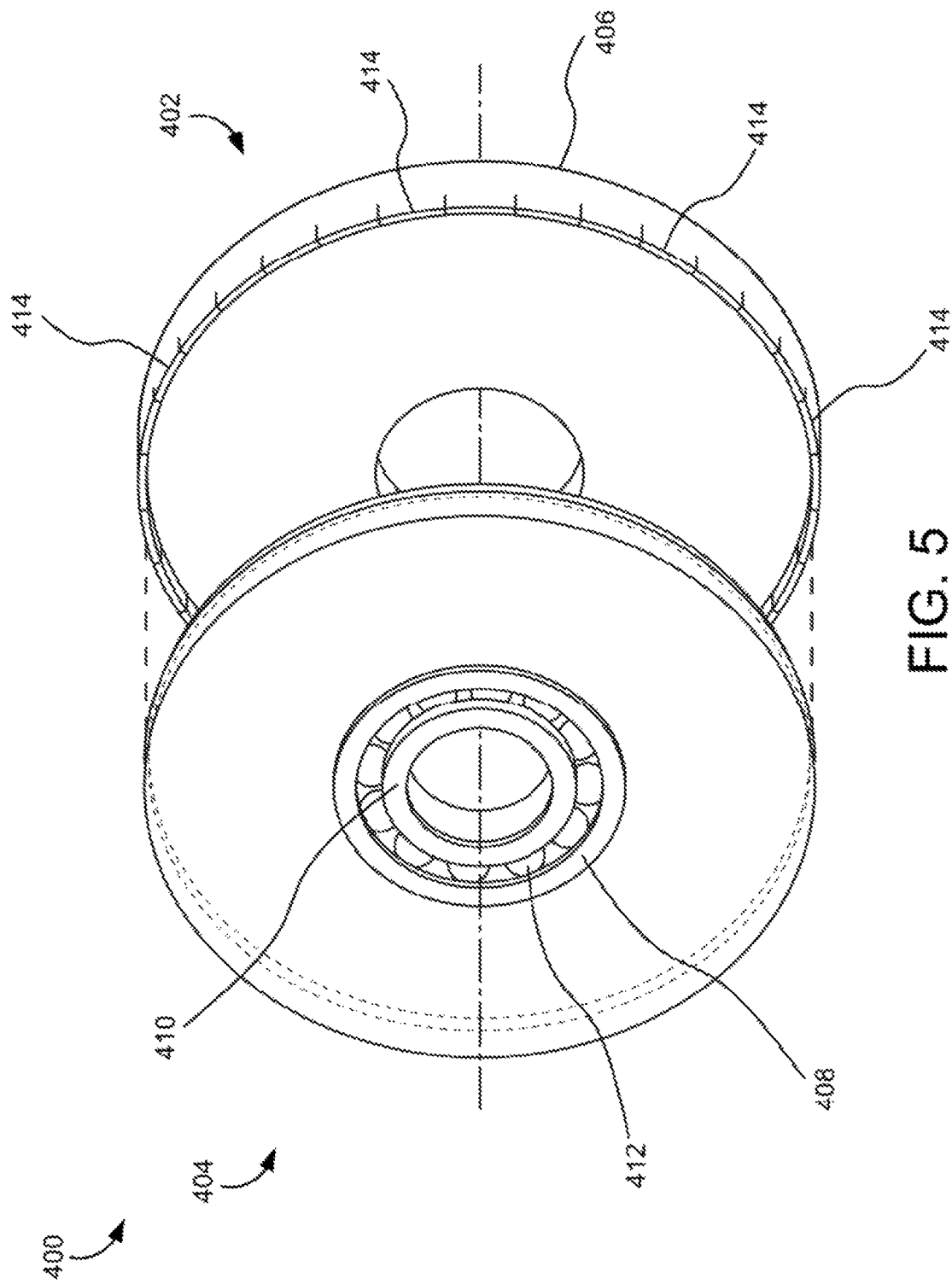
FIG. 5 is an exploded view of the self-centering bearing assembly of FIG. 4, according to some embodiments.
Figure 6:
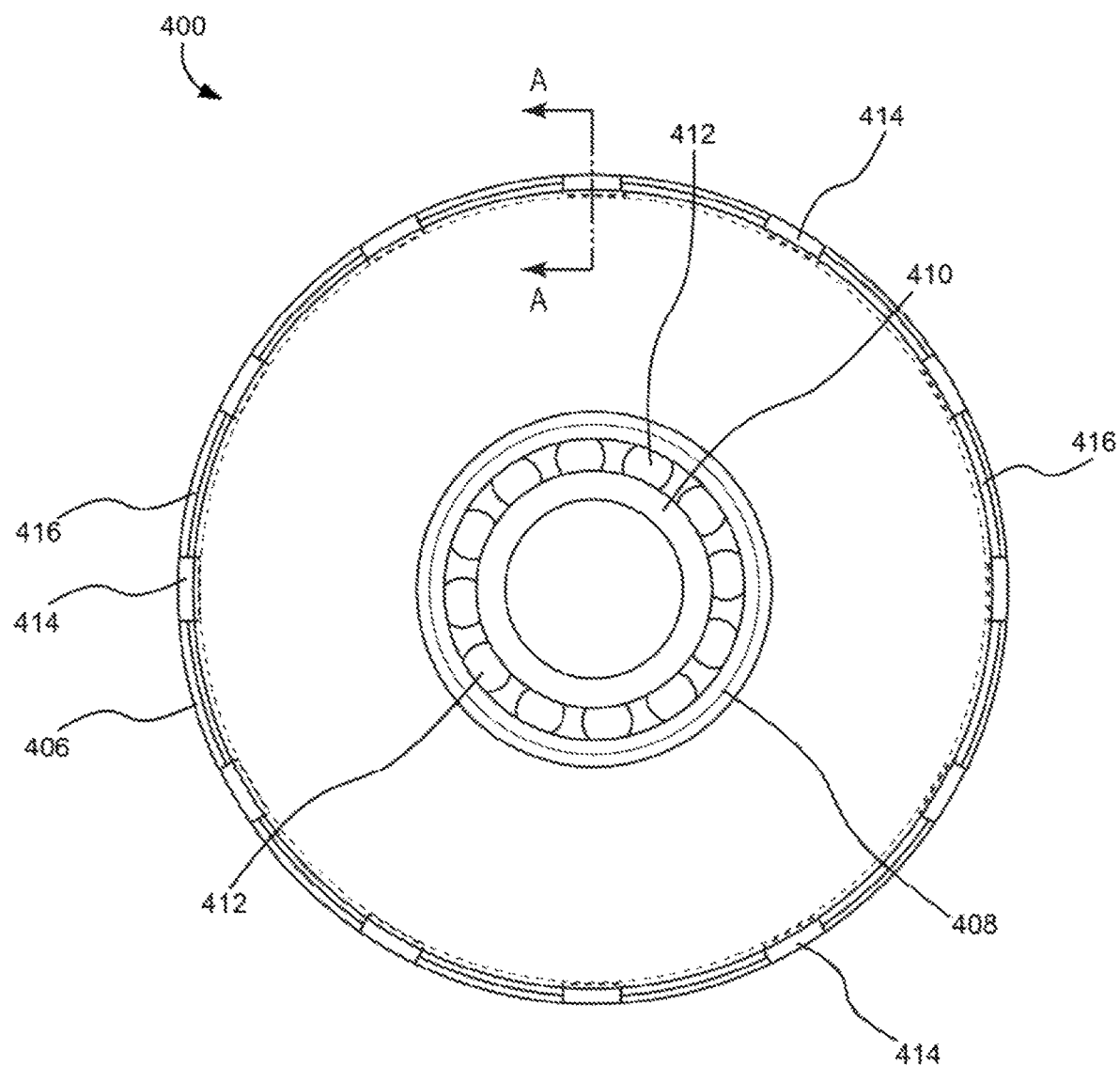
FIG. 6 is a front elevation view drawing of the self-centering bearing assembly of FIG. 4, according to some embodiments.

Referring now to FIG. 4-6, an isometric view, an exploded view, and a front elevation view of a self-centering bearing assembly 400 are respectively depicted. The self-centering bearing assembly 400 is configured to permit an auxiliary bearing device to be coupled to and automatically located relative to a magnetic bearing device without requiring the use of shim parts or a manual adjustment process. In order to function effectively, the auxiliary bearing device must be concentric to the magnetic bearing device. As used herein, "self-centering" may refer to the geometric features of the bearing assembly 400 that permit the auxiliary bearing device to be located concentrically relative to the magnetic bearing device without requiring the use of manual locating parts or processes. In various embodiments, tolerances for concentric location of the bearing devices relative to each other may not exceed 10% of a nominal clearance dimension between the magnetic bearing device and the motor shaft, or the auxiliary bearing device and the motor shaft. Nominal clearance may be defined as perfectly concentric alignment between the magnetic and auxiliary bearing devices and the motor shaft. In various embodiments, the self-centering bearing assembly 400 may be utilized in a high speed induction motor (e.g., motor 104, described above with reference to FIGS. 1-3), although the disclosure herein may be utilized in any context for which both magnetic and auxiliary bearings are required.

Self-centering bearing assembly 400 is shown to include a magnetic bearing support housing 402 and an auxiliary bearing support housing 404. Both the magnetic bearing support housing 402 and the auxiliary bearing support housing 404 have a substantially disc-like shape and are configured to respectively couple to a magnetic bearing device and an auxiliary bearing device such that the housings 402 and 404 are concentric. The magnetic bearing device (not depicted in FIGS. 4-7) may be a radial or thrust AMB. The auxiliary bearing device, which may alternatively be referred to as a backup bearing device or a touch down bearing device, provides support for a motor shaft under certain conditions. These conditions may include, but are not limited to, deactivation of the magnetic bearing device, overload of the magnetic bearing device, or failure of a magnetic bearing device component. The auxiliary bearing device may also support the motor shaft when the motor is stationary (i.e., not rotating).

In various embodiments, the auxiliary bearing device is a ball bearing device. As shown in FIGS. 4-6, the ball bearing device may include an outer ring 408, an inner ring 410, and multiple balls 412 located between the outer ring 408 and inner ring 410 to maintain a separation between the outer ring 408 and the inner ring 410. The outer ring 408 may be coupled to the auxiliary bearing support housing 404 using any suitable method. In various embodiments, the auxiliary bearing device may be another type of rolling-element bearing (e.g., a cylindrical or spherical roller bearing, a needle bearing) or any other suitable type of auxiliary bearing.

The magnetic bearing support housing 402 is shown to include multiple flexure tabs 414 distributed about an outer diameter portion 406 of the magnetic bearing support housing 402 and extending in an axial direction. The flexure tabs 414 are distributed at regular intervals about the outer diameter portion 406 in order to ensure uniform distribution of loads, and self-centering (i.e., concentric location) of the auxiliary bearing support housing 404 relative to the magnetic bearing support housing 402. The flexure tabs 414 may have any cross-sectional shape or dimensions (i.e., flexure tab thickness, flexure tab length) required to support the loads induced in the coupling of the auxiliary bearing support housing 404 to the magnetic bearing support housing 402. In various embodiments, the magnetic bearing support housing 402 may include as few as three flexure tabs 414, although the magnetic bearing support housing 402 may include any number of flexure tabs 414 required to support and effectively locate the auxiliary bearing support housing 404 (e.g., twelve flexure tabs 414, as depicted in FIG. 6). In some embodiments, the area of the radial surfaces 416 disposed between each flexure tab 414 may be minimized such that the flexure tabs 414 resemble the collet fingers of a split collet device (e.g., a collet chuck used in machining applications). For example, in the embodiment depicted in FIG. 5, the flexure tabs 414 are distributed about the outer diameter portion 406 such that an absolute minimum clearance is provided between each of the flexure tabs 414.

Figure 7:
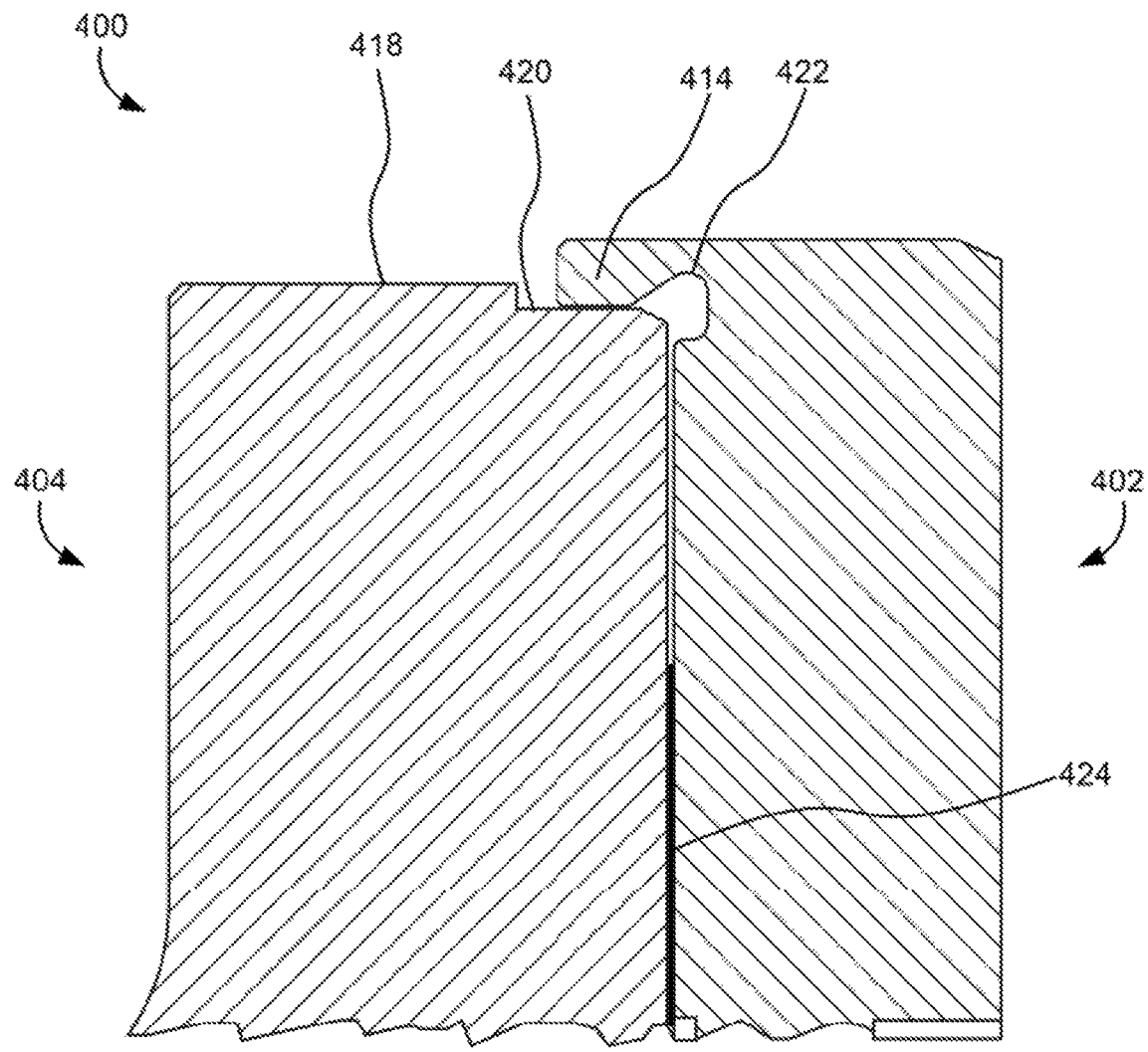
FIG. 7 is a partial sectional view drawing of the self-centering bearing assembly taken about the line A-A of FIG. 6, according to some embodiments.

Referring now to FIG. 7, a partial section view of the self-centering bearing assembly 400 taken along the line A-A of FIG. 6 is depicted. As shown, the auxiliary bearing support housing 404 is shown to include a first diameter housing portion 418 and a second diameter housing portion 420. The first diameter housing portion 418 may be larger than the second diameter portion 420. The flexure tabs 414 of the magnetic bearing support housing 402 are configured to couple to the second diameter housing portion 420 of the auxiliary bearing support housing 404 in an interference fit such that the magnetic bearing support housing 402 and the auxiliary bearing support housing 404 are retained in a coupled state through frictional forces and without the use of any additional fasteners or components. In order to achieve the interference fit, the second diameter portion 420 may be precision machined to maintain a tight diameter tolerance, and the flexure tabs 414 may be configured to flex at flexure points 422. In some embodiments, the bearing assembly 400 additionally includes a axial shim 424 disposed between the magnetic bearing support housing 402 and the auxiliary bearing support housing 404 in order to maintain a required spacing between the housings 402 and 404.

Although FIGS. 4-7 depict the flexure tabs 414 disposed on the magnetic bearing support housing 402, in other embodiments, the flexure tabs 414 may be disposed on and extending from the auxiliary bearing support housing 404. In various embodiments, the magnetic bearing support housing 402 and the auxiliary bearing support housing 404 may be fabricated from any suitable material, including, but not limited to aluminum, cast iron, nickel, or stainless steel. The selection of material(s) for housings 402 and 404 may be based on a variety of factors, including cost, ease of machining, size of the bearing devices, and expected loads on the bearing devices.

Figure 8:
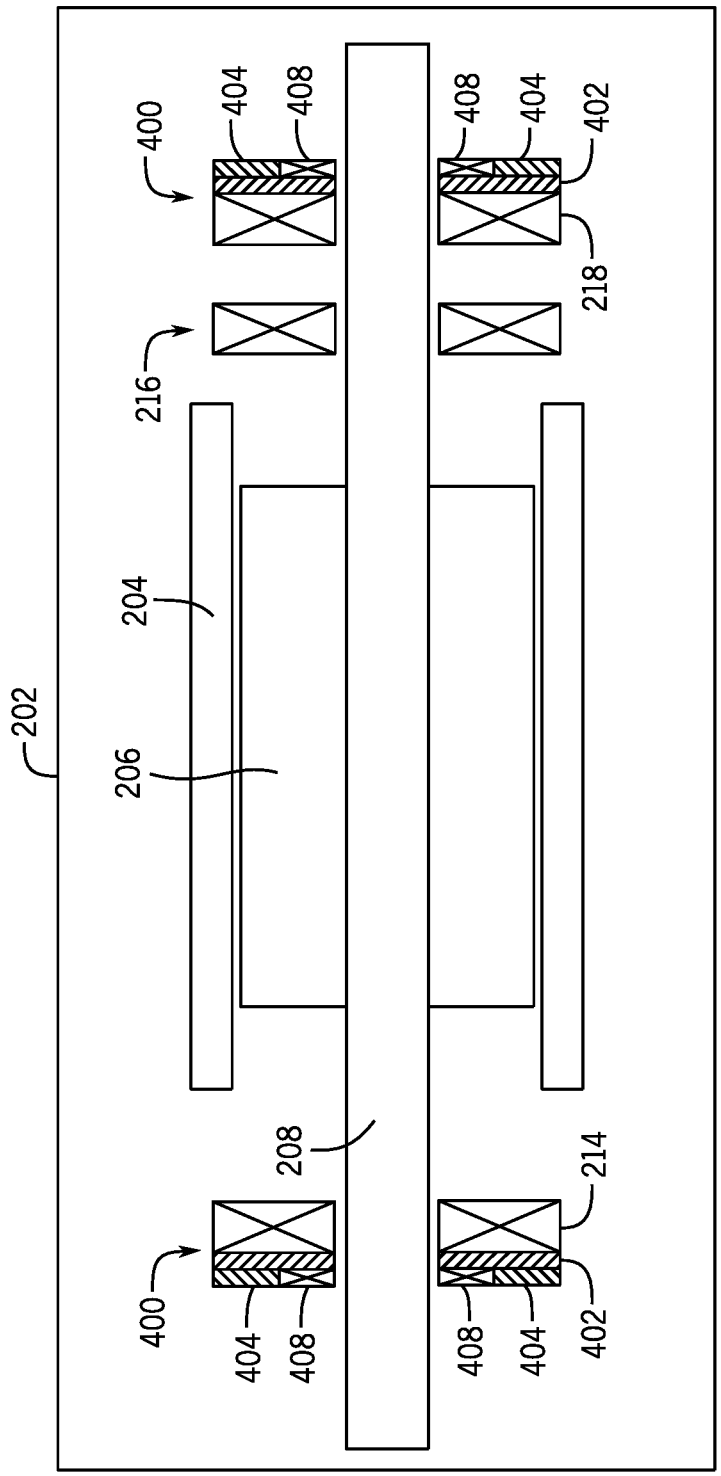
FIG. 8 is a schematic cross-sectional side view of a motor having self-centering bearing assemblies supporting a shaft, according to some embodiments.

FIG. 8 is a schematic cross-sectional side view of a motor including features described in detail above with reference to FIGS. 4-7. For example, in accordance with the presently disclosed techniques, the illustrated embodiment includes the shaft 208 supported by self-centering bearing assemblies 400. As discussed above, each self-centering bearing assembly 400 may include a magnetic bearing assembly 214, 218 configured to support the shaft 208, a magnetic bearing support housing 402 coupled to the magnetic bearing assembly 214, 218, an auxiliary bearing device (e.g., including outer ring 408) configured to support the shaft 208, and an auxiliary bearing support housing 404 coupled to the auxiliary bearing device.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. A self-centering bearing assembly, comprising:
a magnetic bearing device configured to support a rotating shaft;
a magnetic bearing support housing coupled to the magnetic bearing device, the magnetic bearing support housing having a first disc-like shape and a plurality of tabs extending from an outer diameter portion in an axial direction;
an auxiliary bearing device configured to support the rotating shaft during an auxiliary bearing condition;
an auxiliary bearing support housing coupled to the auxiliary bearing device, the auxiliary bearing support housing having a second disc-like shape with a first diameter portion and a second diameter portion, the first diameter portion having a larger diameter than the second diameter portion;
wherein the plurality of tabs is configured to couple to the second diameter portion such that the auxiliary bearing support housing is concentric to the magnetic bearing support housing.

2. The bearing assembly of claim 1, wherein the plurality of tabs is coupled to the second diameter portion using an interference fit.

3. The bearing assembly of claim 1, wherein the auxiliary bearing device is a ball bearing comprising an inner ring, an outer ring, and a plurality of balls situated between the inner ring and the outer ring.

4. The bearing assembly of claim 1, wherein the plurality of tabs comprises at least three tabs.

5. The bearing assembly of claim 1, wherein the plurality of tabs is spaced about the outer diameter portion at regular intervals.

6. The bearing assembly of claim 1, further comprising an axial shim disposed between the magnetic bearing support housing and the auxiliary bearing support housing to maintain a required spacing between the magnetic bearing support housing and the auxiliary bearing support housing.

7. The bearing assembly of claim 1, wherein the auxiliary bearing condition comprises at least one of a deactivation of the magnetic bearing device, an overload of the magnetic bearing device, and a failure of a magnetic bearing device component.

8. A vapor compression system, comprising:
a centrifugal compressor directly driven by a sealed induction motor, a condenser, an expansion device, and an evaporator connected in a closed refrigerant loop;
wherein the sealed induction motor comprises:
a stator;
a rotor;
a shaft comprising a first end and a second end, the rotor and the shaft configured to rotate relative to the stator;
a first radial magnetic bearing assembly located proximate the first end of the shaft and a second radial magnetic bearing assembly located proximate the second end of the shaft, the first and second radial magnetic bearing assemblies configured to support the shaft in a radial direction; and
a thrust magnetic bearing assembly configured to support the shaft in an axial direction
wherein each of the first radial magnetic bearing assembly, the second radial magnetic bearing assembly and the thrust magnetic bearing assembly comprises:
a magnetic bearing device supported in a magnetic bearing housing; and
an auxiliary bearing device supported in an auxiliary bearing housing;
wherein the auxiliary bearing housing is coupled to the magnetic bearing housing using a plurality of tabs extending from the magnetic bearing housing such that the auxiliary bearing housing is concentric to the magnetic bearing housing.

9. The vapor compression system of claim 8, wherein the plurality of tabs is coupled to the auxiliary bearing housing using an interference fit.

10. The vapor compression system claim 8, wherein the auxiliary bearing device is a ball bearing comprising an inner ring, an outer ring, and a plurality of balls situated between the inner ring and the outer ring.

11. The vapor compression system of claim 8, wherein the plurality of tabs comprises at least three tabs.

12. The vapor compression system of claim 8, further comprising an axial shim disposed between the magnetic bearing housing and the auxiliary bearing housing to maintain a required spacing between the magnetic bearing housing and the auxiliary bearing housing.

13. The vapor compression system of claim 8, wherein each of the magnetic bearing housing and the auxiliary bearing housing has a disc-like shape.

14. A self-centering bearing assembly, comprising:
a first bearing support housing coupled to a first bearing device configured to support a rotating shaft, the first bearing support housing having a first disc-like shape and a plurality of tabs extending from an outer diameter portion in an axial direction;

a second bearing support housing coupled to a second bearing device configured to support the rotating shaft, the second bearing support housing having a second disc-like shape with a first diameter portion and a second diameter portion, the first diameter portion having a larger diameter than the second diameter portion;

wherein the plurality of tabs is configured to couple to the second diameter portion such that the second bearing support housing is concentric to the first bearing support housing.

15. The bearing assembly of claim 14, wherein the first bearing device is a magnetic bearing device and the second bearing device is an auxiliary bearing device.

16. The bearing assembly of claim 14, wherein the first bearing device is an auxiliary bearing device and the second bearing device is a magnetic bearing device.

17. The bearing assembly of claim 14, wherein the plurality of tabs is coupled to the second diameter portion using an interference fit.

18. The bearing assembly of claim 14, wherein the plurality of tabs comprises at least three tabs.

19. The bearing assembly of claim 14, wherein the plurality of tabs is spaced about the outer diameter portion at regular intervals.

20. The bearing assembly of claim 14, wherein the second bearing device is a ball bearing comprising an inner ring, an outer ring, and a plurality of balls situated between the inner ring and the outer ring.

* * * * *